(12) United States Patent
Park

(10) Patent No.: US 7,495,168 B2
(45) Date of Patent: Feb. 24, 2009

(54) ELECTRIC DIPOLE STREAMER DISCHARGE TYPE LIGHTNING CONDUCTOR

(75) Inventor: Woo-Heon Park, Seoul (KR)

(73) Assignee: Sunkwang LTI Inc, Seoul (KR)

( * ) Notice: Subject to any disclaimer, the term of this patent is extended or adjusted under 35 U.S.C. 154(b) by 0 days.

(21) Appl. No.: 11/761,941

(22) Filed: Jun. 12, 2007

(65) Prior Publication Data

US 2008/0023210 A1 Jan. 31, 2008

(30) Foreign Application Priority Data

Jul. 28, 2006 (KR) .................. 10-2006-0071500

(51) Int. Cl.
*H01R 4/66* (2006.01)

(52) U.S. Cl. .................. 174/7; 174/2; 174/3; 174/6; 174/51; 361/117; 361/216; 439/98

(58) Field of Classification Search .......... 174/2–3, 174/4 R, 5 R, 6–7, 51, 35, 40 CC, 135; 361/117, 361/216, 219, 222; 439/98, 92, 100
See application file for complete search history.

(56) References Cited

U.S. PATENT DOCUMENTS

| 2,128,408 | A | * | 8/1938 | Grenier | ............... 174/4 C |
| 4,480,146 | A | | 10/1984 | Invernizzi | |
| 4,652,694 | A | * | 3/1987 | Goldman et al. | ............ 174/3 |
| 5,998,731 | A | * | 12/1999 | Takamura | .............. 174/3 |
| 6,930,239 | B1 | * | 8/2005 | Chen | .................... 174/7 |
| 7,282,637 | B2 | * | 10/2007 | Stockin et al. | ............ 174/6 |

FOREIGN PATENT DOCUMENTS

| EP | 0228984 | 7/1987 |
| KR | 10-0246084 | 12/1999 |
| KR | 20-0201454 | 8/2000 |

* cited by examiner

*Primary Examiner*—Dhiru R Patel
(74) *Attorney, Agent, or Firm*—IPLA P.A.; James E. Bame

(57) ABSTRACT

Disclosed therein is an electric dipole streamer discharge type lightning conductor, which can gather electric charges in the atmospheric air at one side thereof and generate an electric discharge due to a dielectric breakdown when a potential difference is formed between the electric charges gathered by an electric dipole and the electric charges of the earth so as to emit a great deal of electric charges of the earth toward thunderclouds to thereby induce a thunderbolt.

2 Claims, 3 Drawing Sheets

ELECTRIC DIPOLE STREAMER DISCHARGE TYPE LIGHTNING CONDUCTOR

CROSS REFERENCE

Applicant claims foreign priority under Paris Convention and 35 U.S.C. § 119 to Korean Patent Application No. 10-2006-0071500, filed Jul. 28, 2006 with the Korean Intellectual Property Office.

BACKGROUND OF THE INVENTION

1. Field of the Invention

The present invention relates to an electric dipole streamer discharge type lightning conductor, which can gather electric charges in the atmospheric air at one side thereof and generate an electric discharge due to a dielectric breakdown when a potential difference is formed between the electric charges gathered by an electric dipole and the electric charges of the earth so as to emit a great deal of electric charges of the earth toward thunderclouds to thereby induce a thunderbolt.

2. Background Art

In general, an electromagnetic field causes a phase change in an area where thunderclouds, which induce a thunderbolt, approach. Such an electromagnetic field rises up to a range of 5 kV/m to 30 kV/m, and a potential difference between the thunderclouds and the earth reaches several tens of millions of volt.

Due to the potential difference between the thunderclouds and the earth, the atmospheric air is in an electric charge state, electric charges of polarity, which is opposite to the polarity of the electric charges in the atmospheric air located at a protruding part on the ground, are increased, and the protruding part emits electric charges by a corona effect when the thunderclouds are increased.

A lightning conductor is protrudingly installed on a building on the ground using the above principle, and so induces a corona discharge through the protruding part thereof and emits electric charges when the thunderclouds are increased, to thereby induce a thunderbolt.

Meanwhile, European Patent No. 0228984 discloses a spark-gap lightning conductor having a grounded metal rod surrounded by a hollow cell made of metal. The rod has one end grounded and the other end having a tip which is protrudingly exposed to the outside through a rounded opening formed on the hollow cell. The hollow cell is insulated from the metal rod by the air, and so, an air gap restricts an interval between the rounded opening of the cell and the tip of the metal rod. Moreover, it is necessary to connect the hollow cell to a central rod due to an isolation resistance of high impedance.

Therefore, if strong thunderclouds occur in the vicinity of the lightning conductor and a falling flash reaches near the lightning conductor, the metal cell is charged in such a way that sparks are formed in the cell, crosses the air gap and arrives at a critical potential transferred to the tip of the rod.

However, the sparks, which formed at both ends of the gap located between the rod and the metal cell, are generated irregularly, and formed at the tip of the rod in a premature manner.

In addition, European Patent No. 0096655 discloses a lightning conductor device including a grounded rod, a first part extending in a radial direction with respect to the rod for easily grasping large electric potential, and a second part spaced apart from the first part and forming an electrode extending toward the rod along a curved passageway located at a short distance from the rod, so that an electric discharge occurs between the electrode and the rod when it storms.

However, the lightning conductors according to the prior arts have several problems in that it is complicated to install the lightning conductors and the lightning conductors are operated unsatisfactorily.

SUMMARY OF THE INVENTION

Accordingly, the present invention has been made to solve the above-mentioned problems occurring in the prior arts, and it is an object of the present invention to provide an electric dipole streamer discharge type lightning conductor, which can gather electric charges in the atmospheric air at one side thereof and generate an electric discharge due to a dielectric breakdown when a potential difference is formed between the electric charges gathered by an electric dipole and the electric charges of the earth so as to emit a great deal of electric charges of the earth toward thunderclouds to thereby induce a thunderbolt.

To accomplish the above object, according to the present invention, there is provided an electric dipole streamer discharge type lightning conductor, which includes: a body connected at a lower portion thereof to the earth and allowing electric currents of a thunderbolt to flow to the earth when the falling of a thunderbolt occurs; a thunderbolt receiving part being a conductive tip and located at the uppermost end of the body; an insulating part having an insulating material layer coated with on the surface thereof to prevent electric charges of the earth from being transferred to the outside of the insulating material layer; and a discharge inducing part having one end fixed to the surface of the insulating material layer and the other end spaced apart from the body for gathering electric charges in the atmospheric air to the surface thereof, wherein the discharge inducing part includes: a first discharge inducing part formed in a conical shape, in such a way that one end thereof is fixed on the insulating material layer of the insulating part and the other end thereof is spaced apart from the body, the first discharge inducing part having at least one groove formed on the surface thereof to gather a great deal of negative (−) electric charges in the atmospheric air; and a second discharge inducing part formed in a semi-conical shape correspondingly to the first discharge inducing part and spaced apart from the first discharge inducing part, the second discharge inducing part having one end fixed on the body and the other end spaced apart from the body to gather a great deal of positive (+) electric charges in the earth, whereby when thunderclouds are formed, the first discharge inducing part carries out a dielectric breakdown due to an air gap formed by potential differences between the first discharge inducing part and the spaced body and between the first discharge inducing part and the spaced second discharge inducing part.

Preferably, the discharge inducing part is formed in a conical shape.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings. A lightning conductor according to the present invention acts in correspondence with all of thunderclouds of a positive polarity and a negative polarity, and preferred embodiments of the present invention will be described in connection with the thunderclouds of negative (−) polarity.

Figure 1:
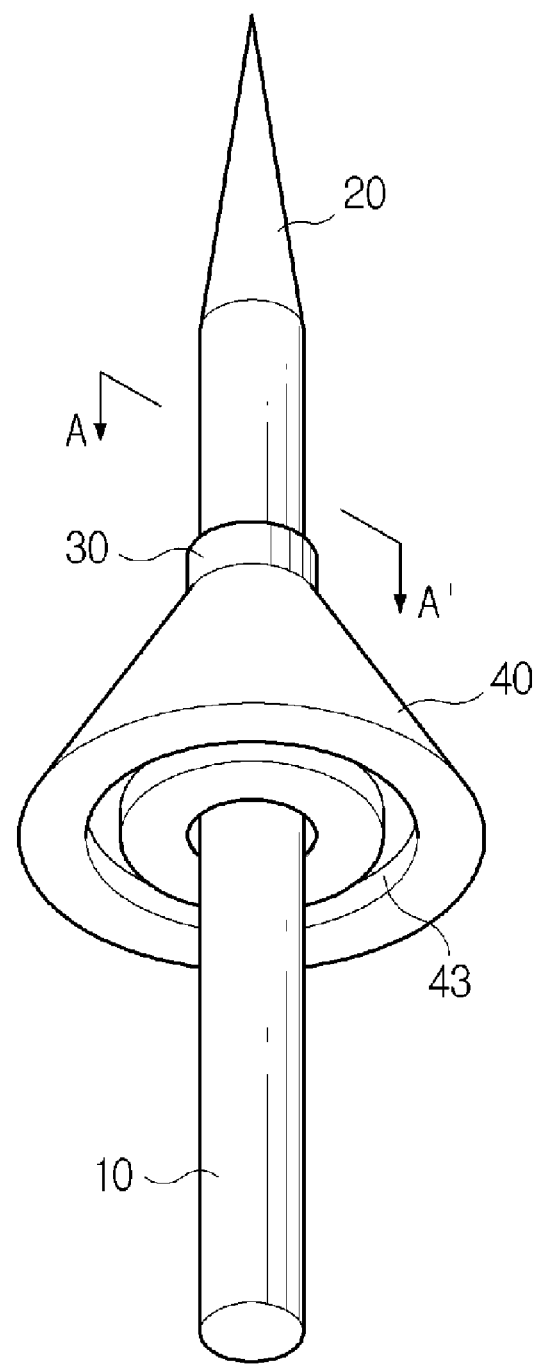
FIG. 1 is a perspective view of an electric dipole streamer discharge type lightning conductor according to a preferred embodiment of the present invention.
Figure 2:
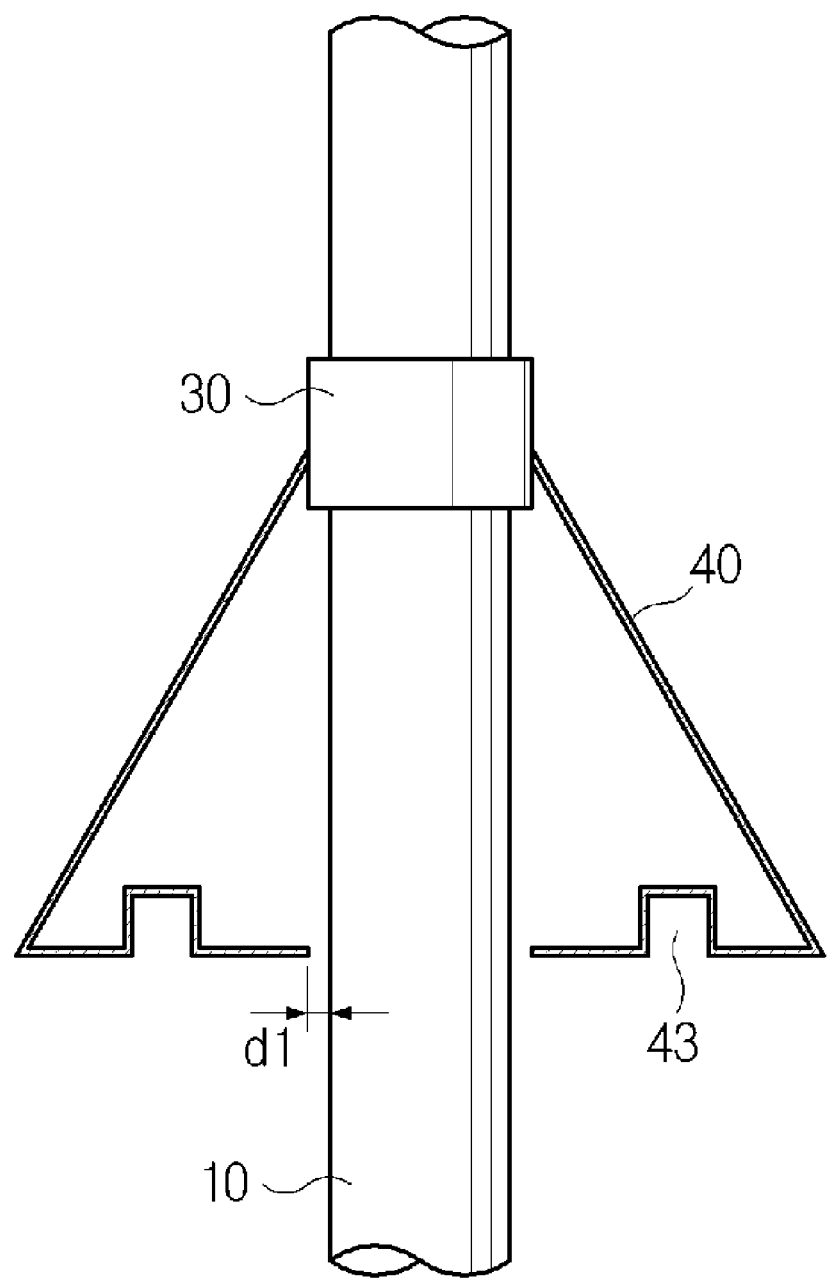
FIG. 2 is an enlarged sectional view of an electric discharge inducing part according to the preferred embodiment of the present invention.
Figure 3:
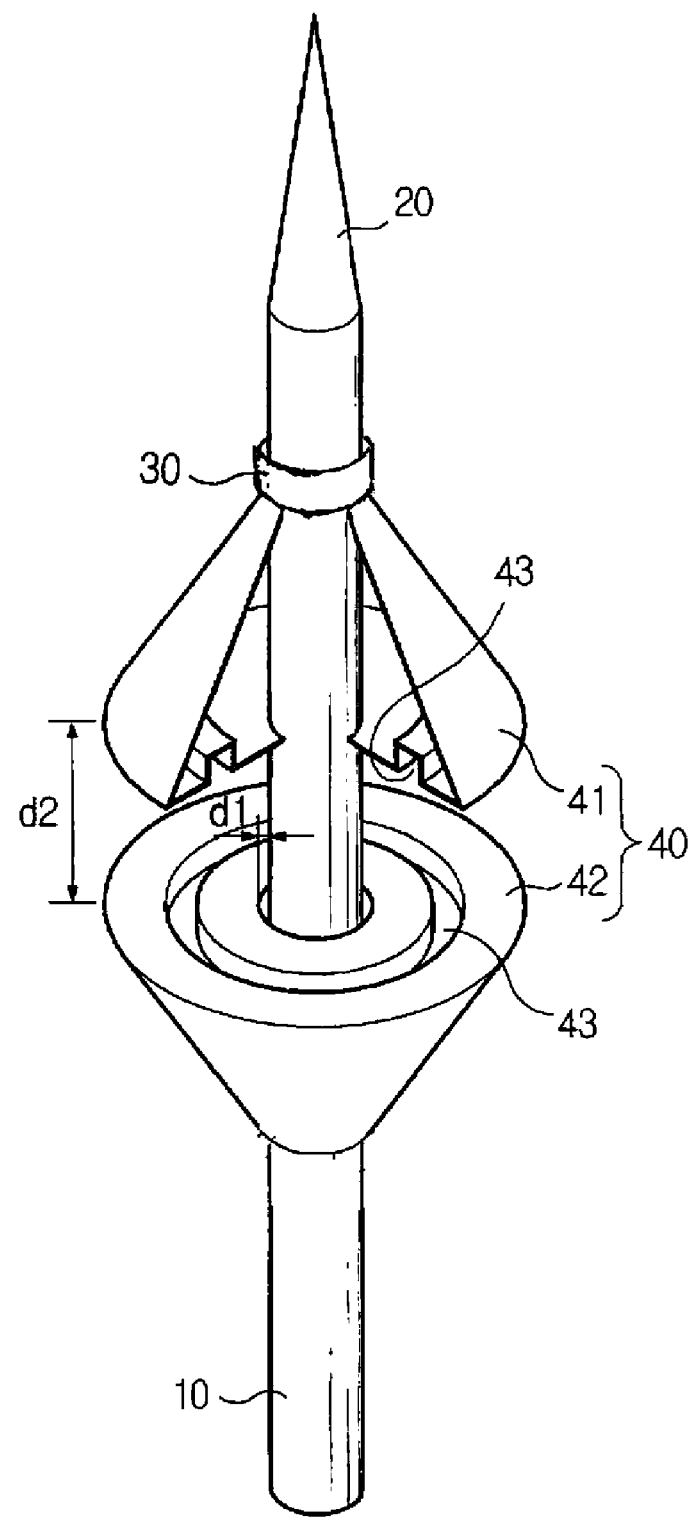
FIG. 3 is a perspective view of an electric dipole streamer discharge type lightning conductor according to another preferred embodiment of the present invention.

FIG. 1 is a perspective view of an electric dipole streamer discharge type lightning conductor according to a preferred embodiment of the present invention, FIG. 2 is an enlarged sectional view of an electric discharge inducing part according to the preferred embodiment of the present invention, and FIG. 3 is a perspective view of an electric dipole streamer discharge type lightning conductor according to another preferred embodiment of the present invention.

As shown in FIGS. 1 and 2, the lightning conductor according to the present invention includes a body 10, a thunderbolt receiving part 20, an insulating part 30, and a discharge inducing part 40.

The body 10 of the lightning conductor receives positive (+) electric charges from the earth when the thunderclouds are formed, is electrified to the positive (+) electric charge, and then, sends electric currents of a thunderbolt to the earth when the thunderbolt is generated. It is preferable that the body 10 is made of stainless steel to endure a thermal intensity and a mechanical intensity generated during the falling of the thunderbolt.

The thunderbolt receiving part 20 is located at the uppermost end of the body 10, and is a conductive tip to induce a corona discharge of the positive (+) electric charge formed while an electric field strength of the surface of the earth is increased more than 5 kV/m after the thundercloud is formed. The thunderbolt receiving part 20 is a start point of an upward streamer due to the corona discharge by the positive (+) electric charges, and moves the electric currents of the thunderbolt through the surface when the thunderbolt is transferred from the thunderclouds.

The insulating part 30 is coated with an insulating material layer on the surface thereof or surrounded with an insulating material such as rubber to thereby prevent that the positive (+) electric charges of the earth are transferred to the surface of the insulating material layer when two electric charges, which have the same size but different signals, are spaced apart from each other at a small distance like an electric dipole phenomenon. However, since the body located inside the insulating part 30 is made of a conductive material, the positive (+) electric charges of the earth can move through the body, and a great deal of electric currents of the thunderbolt generated by a lightning stroke can move to the earth through the surface of the body 10.

The discharge inducing part 40 has one end located on the surface of the insulating part 30 and the other end spaced apart from the body at a predetermined distance, and negative (−) electric charges in the atmospheric air are gathered on the surface of the discharge inducing part 40.

Referring to FIG. 2, the discharge inducing part 40 will be described in detail. It is preferable that the discharge inducing part 40 is formed in a circular or conical shape to increase a surface area. On the surface of the discharge inducing part 40 are gathered the negative (−) electric charges, which are opposite to the positive (+) electric charges existing in the body 10. When a great deal of the electric charges are gathered, a potential difference occurs at an interval (d) between one end portion of the discharge inducing part 40, which has the negative (−) electric charges, and the body 10, which has the positive (+) electric charges, due to a difference of the gathered electric charges. When the potential difference is increased, a dielectric breakdown occurs due to the air gap formed at the interval (d) between the end portion of the discharge inducing part 40 and the body 10, and so, a flow of the electric current occurs by an electric discharge. By the dielectric breakdown, when a great deal of the positive (+) electric charges of the earth are supplied to the thunderbolt receiving part 20 of the lightning conductor along the body and the discharge inducing part by the electric dipole concept, the positive (+) electric charges are emitted toward the thunderclouds of the negative (−) electric charges, in a streamer type to induce the negative (−) electric charges of the thunderclouds, whereby the thunderbolt can be easily generated.

Meanwhile, it is preferable that the discharge inducing part 40 has a plurality of grooves 43 formed on the surface thereof to increase an amount of the negative (−) electric charges gathered on the surface thereof.

As shown in FIG. 3, in another preferred embodiment of the present invention, the discharge inducing part 40 includes: a first discharge inducing part 41 having one end fixed on the insulating material layer of the insulating part 30 and the other end being formed in a circular or a conical shape and outwardly spaced apart from the body at a predetermined interval; and a second discharge inducing part 42 located above the first discharge inducing part 41 and spaced apart from the first discharge inducing part, the second discharge inducing part 42 having one end fixed on the body and the other end spaced apart from the body at a predetermined interval. In this instance, the discharge inducing part 40 has the same effect even though the other end of the second discharge inducing part 42 is fixed on the body 10.

As described above, since the first discharge inducing part 41 has the end fixed on the insulating material layer of the insulating part 30 and the other end spaced apart from the body at the predetermined interval, the negative (−) electric charges in the atmospheric air are gathered. On the other hand, since the second discharge inducing part 42 is directly fixed on the body, the negative (−) electric charges of the earth are gathered.

So, when the earth electric field rises, a great deal of the positive (+) electric charges are gathered on the surface of the first discharge inducing part 41 and a great deal of the negative (−) electric charges are gathered on the surface of the second discharge inducing part 42, and a potential difference occurs due to a difference of electric charges gathered at an interval (d2) between the first discharge inducing part 41 and the second discharge inducing part 42. When the potential difference is increased, an electric discharge is generated at the interval (d2) between the first discharge inducing part 41 and the second discharge inducing part 42 due to a dielectric breakdown by an air gap, and so, a flow of electric current occurs.

Finally, the first discharge inducing part 41 raises the first electric discharge at an interval (d1) between the end of the first discharge inducing part 41 and the body (10) and the second electric discharge at the interval (d2) between the first discharge inducing part 41 and the second discharge inducing part 42 to thereby generate a great deal of electric currents. After that, when the positive (+) electric charges of the earth is supplied to the thunderbolt receiving part of the lightning conductor along the first discharge inducing part 41 and the second discharge inducing part 42, the positive (+) electric charges are emitted toward the thunderclouds of the negative (−) electric charges in a streamer type to induce the negative (−) electric charges of the thunderclouds, whereby the thunderbolt can be easily generated.

An operation of the lightning conductor having the above configuration according to the present invention will be described as follows.

When the thunderclouds of the negative (−) polarity, which generate the thunderbolt, are formed, the polarity of the earth is induced into the positive (+) polarity, which is opposite to the original polarity of the earth, due to an electrostatic induction, and the electric field strength of more than 5 kV/m is formed between the thunderclouds and the earth. The electric field strength to the earth is gradually increased when a strength of the thundercloud is increased.

The negative (−) electric charges in the atmospheric air formed by the above change of the electric field strength are charged to the discharge inducing part 40 extending from the surface of the insulating part 30, and the positive (+) electric charges are charged to the body 10, which is connected to the earth, and the thunderbolt receiving part 20.

In addition, when a voltage of more than a predetermined volume is generated between the discharge inducing part charged with the negative (−) electric charges and the body charged with the positive (+) electric charges as the thunderclouds are increased, the electric discharge occurs at the interval between the discharge inducing part 40 and the body 10 due to the dielectric breakdown by the air gap, and so, the flow of the electric currents occurs.

The dielectric breakdown induces the thunderbolt of the thunderclouds since the positive (+) electric charges are emitted toward the thunderclouds of the negative (−) electric charges in the streamer type when a great deal of the positive (+) electric charges are supplied to the thunderbolt receiving part 20 along the body 10 and the discharge inducing part by the electric dipole phenomenon.

When the thunderbolt strikes the thunderbolt receiving part 20 of the lightning conductor, the electric current of the thunderbolt moves to the body 10 along the outer surface of the thunderbolt receiving part 20, downwardly moves along the surface of the body 10, and then, disappears while flowing into the earth along a conductive line connected to the body 10.

EXAMPLE 1

Early discharge time difference inspection tests on a "high-performance lightning conductor SK-9", which was manufactured according to the present invention, and a typical lightning conductor were carried out by Korea Electrotechnology Research Institute. A discharge time of the lightning conductor was measured after a voltage was applied under test conditions that temperature was 19.0° C., humidity was 69.0%, switching impulse applied voltage at atmospheric pressure of 993 hPa was 580 kV, applied DC voltage was 40 kV and applied waveform was 240/2850 μs. After that, the discharge time was converted into a standard waveform of 650 μs to obtain a discharge time difference, and then, the test result was indicated in a Table 1.

TABLE 1

| Specimen | Average discharge time | Average discharge time converted into standard waveform of 650 μs | Discharge time difference |
|---|---|---|---|
| SK-9 | 109.0 μs | 295.2 μs | 50.1 μs |
| Typical lightning conductor | 127.5 μs | 345.3 μs | — |

As shown in Table 1, the average discharge time of the typical lightning conductor was 127.5 μs, but the average discharge time of the lightning conductor manufactured according to the present invention was 109.0 μs. So, it shows that the lightning conductor according to the present invention can induce the thunderbolt faster than the typical lightning conductor. That is, the lightning conductor according to the present invention can induce the thunderbolt by reducing the discharge time of 50.1 μs in comparison with the typical lightning conductor when it is converted into the standard waveform.

Considering that a streamer discharge time is indicated by μs/m, the reduced discharge time means that a protection range of the lightning conductor is widened since the lightning conductor according to the present invention is 50.1 m longer in a protectable length than the typical lightning conductor.

As described above, the electric dipole streamer discharge type lightning conductor according to the present invention can generate the electric discharge due to the dielectric breakdown when the potential difference is formed by the increase of the earth electric field after the electric charges in the atmospheric air are gathered, and directly emit a great deal of earth electric charges toward the thunderclouds to actively induce the thunderbolt, thereby improving a protection efficiency and widening the protectable range so as to satisfy economical efficiency and safety.

In addition, the lightning conductor according to the present invention can control the discharge time to induce the thunderbolt by adjusting the interval between the discharge inducing part and the body.

Furthermore, the lightning conductor according to the present invention can be used semi-permanently by inducing the electric discharge without using a power supply device or an electronic circuit board.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. An electric dipole streamer discharge type lightning conductor, which includes: a body connected at a lower portion thereof to the earth and allowing electric currents of a thunderbolt to flow to the earth when the falling of a thunderbolt occurs; a thunderbolt receiving part being a conductive tip and located at the uppermost end of the body; an insulating part having an insulating material layer coated with on the surface thereof to prevent electric charges of the earth from being transferred to the outside of the insulating material layer; and a discharge inducing part having one end fixed to the surface of the insulating material layer and the other end spaced apart from the body for gathering electric charges in the atmospheric air to the surface thereof, wherein the discharge inducing part includes:

a first discharge inducing part formed in a conical shape, in such a way that one end thereof is fixed on the insulating material layer of the insulating part and the other end thereof is spaced apart from the body, the first discharge inducing part having at least one groove formed on the surface thereof to gather a great deal of negative (−) electric charges in the atmospheric air; and a second discharge inducing part formed in a semi-conical shape correspondingly to the first discharge inducing part and spaced apart from the first discharge inducing part, the second discharge inducing part having one end fixed on the body and the other end spaced apart from the body to gather a great deal of positive (+) electric charges in the earth, whereby when thunderclouds are formed, the first discharge inducing part carries out a dielectric breakdown due to an air gap formed by potential differences between the first discharge inducing part and the spaced body and between the first discharge inducing part and the spaced second discharge inducing part.

2. The electric dipole streamer discharge type lightning conductor according to claim 1, wherein the body is made of stainless steel.

* * * * *